United States Patent
Rousselot et al.

(10) Patent No.: US 12,520,751 B2
(45) Date of Patent: Jan. 13, 2026

(54) TRANSMISSION CASING, METHOD FOR MOUNTING SAME, AND SELF-PROPELLED VEHICLE PROVIDED WITH SUCH A TRANSMISSION CASING

(71) Applicant: FRANCE REDUCTEURS, Les Herbiers (FR)

(72) Inventors: Rémi Rousselot, Les Herbiers (FR); Pierre Bru, Sevremoine (FR); Bastien Le Roch, Chanverrie (FR)

(73) Assignee: FRANCE REDUCTEURS, Les Herbiers (FR)

( * ) Notice: Subject to any disclaimer, the term of this patent is extended or adjusted under 35 U.S.C. 154(b) by 743 days.

(21) Appl. No.: 17/792,399

(22) PCT Filed: Jan. 12, 2021

(86) PCT No.: PCT/FR2021/050043
§ 371 (c)(1),
(2) Date: Jul. 13, 2022

(87) PCT Pub. No.: WO2021/144526
PCT Pub. Date: Jul. 22, 2021

(65) Prior Publication Data
US 2023/0052464 A1    Feb. 16, 2023

(30) Foreign Application Priority Data

Jan. 17, 2020 (FR) ..................................... 20 00469
Jan. 17, 2020 (FR) ..................................... 20 00470

(51) Int. Cl.
*A01D 34/68* (2006.01)
*F16H 57/023* (2012.01)
(Continued)

(52) U.S. Cl.
CPC ....... *A01D 34/6806* (2013.01); *F16H 57/023* (2013.01); *F16H 57/037* (2013.01);
(Continued)

(58) Field of Classification Search
CPC ........ A01D 34/6806; A01D 2034/6837; F16H 57/023; F16H 57/037; F16H 2057/02034
See application file for complete search history.

(56) References Cited

U.S. PATENT DOCUMENTS 5,522,669 A     6/1996   Recker
5,850,758 A *  12/1998  McCloud ................ F16H 3/083
                                                    74/371

(Continued)

FOREIGN PATENT DOCUMENTS

DE    10 2005 006 407    9/2005
DE    20 2016 003 126    6/2016
(Continued)

OTHER PUBLICATIONS

International Search Report dated Oct. 7, 2020.
Examination Report dated Oct. 25, 2024.

*Primary Examiner* — Thomas C Diaz
(74) *Attorney, Agent, or Firm* — IPSILON USA, LLP

(57) ABSTRACT

Transmission box (1) comprising an output shaft (5) made of a single piece or at least two shaft sections (5A, 5B), said shaft being insertable into the box (2) in the closed state of the box (2) through at least one (3) of the openings (3, 4) referred to as the insertion opening (3) in the box (2), the box (1) further comprising at least one device (8) for limiting the axial displacement of the output shaft (5) or the output shaft section (5A; 5B), this axial displacement limitation device (8) can be activated to pass from an inactive state to an active state in which any axial displacement of the output shaft (5) or of the output shaft section (5A; 5B) inside the box (1) according to at least one direction opposite to the direction
(Continued)

of insertion of the output shaft (5) or the output shaft section into the box (1) is limited or prevented is a device (8) that can be activated in the closed state of the box (1) and is configured to, in the closed state of the box (1), to pass from an inactive state to an active state depending on the position occupied by the output shaft (5) or the output shaft section (5A; 5B) in said box (1) by simple displacement of the output shaft (5) or the output shaft section (5A; 5B) from the or at least one of the insertion openings (3) in the box (1) in the direction of the inside of the box (1).

10 Claims, 25 Drawing Sheets

(51) Int. Cl.
    *F16H 57/037*     (2012.01)
    *F16H 57/02*     (2012.01)
(52) U.S. Cl.
    CPC ............... *A01D 2034/6837* (2013.01); *F16H 2057/02034* (2013.01)

(56) References Cited

U.S. PATENT DOCUMENTS

| | | | |
|---|---|---|---|
| 6,478,709 B1* | 11/2002 | Irwin | F16H 48/08 |
| | | | 74/400 |
| 11,781,635 B2* | 10/2023 | Fukunaga | F16H 57/021 |
| | | | 475/150 |
| 2005/0188784 A1* | 9/2005 | Knox | F16H 57/023 |
| | | | 74/606 R |
| 2018/0119754 A1* | 5/2018 | Teillet | A01D 34/6806 |
| 2018/0242526 A1 | 8/2018 | Zhang et al. | |
| 2019/0277391 A1 | 9/2019 | Yoshimura et al. | |

FOREIGN PATENT DOCUMENTS

| | | |
|---|---|---|
| EP | 3 338 530 A1 | 6/2018 |
| FR | 3 072 433 | 4/2019 |
| JP | H04 259771 | 9/1992 |

* cited by examiner

TRANSMISSION CASING, METHOD FOR MOUNTING SAME, AND SELF-PROPELLED VEHICLE PROVIDED WITH SUCH A TRANSMISSION CASING

RELATED APPLICATION

This application is a National Phase of PCT/FR2021/050043 filed on Jan. 12, 2021, which claims the benefit of priority from French Patent Application Nos. 20 00469, filed on Jan. 17, 2020 and 20 00470 also filed on Jan. 17, 2020, the entirety of which are incorporated by reference.

FIELD OF THE INVENTION

The present invention concerns a transmission box and its mounting method, and to a self-propelled machine, such as a lawnmower, equipped with such a transmission box.

It concerns in particular a transmission box comprising at least two box portions assembled together in the closed state of the box, at least one opening for the access to the inside of the box and an output shaft, insertable into the box through at least one of the openings, referred to as the insertion opening of the box, and configured to, in the inserted state in said box and closed of the box, extend at least partially out of the box, this output shaft being made of a single piece or at least two shaft sections, the box further comprising, for the output shaft or at least one of the output shaft sections, at least one device for limiting the axial displacement of the output shaft or of the output shaft section according to at least one direction opposite to the direction of insertion of the output shaft or of the output shaft section, into said box in the inserted state of the output shaft or the output shaft section in the box and in the closed state of the box.

DESCRIPTION OF THE RELATED ART

A transmission box of the type described above is known, as illustrated in document EP 3 338 530. In most transmission boxes, the output shaft is positioned in the box in the open state of the box before the box is closed. This solution requires to store the transmission box with its shaft mounted in said box, which generates a large space requirement. Solutions are therefore sought to enable limiting the space requirements of the box while its storage. One solution consists of mounting the output shaft in the closed state of the box. However, to date, this solution requires the operator, after inserting the output shaft into the box, to report a part to the output shaft to limit or prevent an axial displacement of the output shaft inside the box, in particular an axial displacement of the output shaft according to a direction opposite to the direction of insertion of the shaft into said box.

OBJECTS AND SUMMARY

One aim of the invention is to propose a transmission box of the above-mentioned type whose design enables a simplification of the mounting of the output shaft on the box in the closed state of the box.

To this end, the invention has for subject matter a transmission box comprising at least two box portions assembled together in the closed state of the box, at least one opening for the access to the inside of the box and an output shaft, that can be inserted into the box through at least one of the openings referred to as the insertion opening of the box, and configured to, in the inserted state in said box and closed state of the box, extend at least partially out of the box, this output shaft being made of a single piece or at least two shaft sections, the box further comprising, for the output shaft or at least one of the output shaft sections, at least one device for limiting the axial displacement of the output shaft or the output shaft section according to at least one direction opposite to the direction of insertion of the output shaft or the output shaft section into said box in the inserted state of the output shaft or the output shaft section in the box and in the closed state of the box, characterized in that this device for limiting axial displacement can be activated to pass from an inactive state to an active state in which any axial displacement of the output shaft or the output shaft section inside the box according to at least one direction opposite to the direction of insertion of the output shaft or the output shaft section into the box is limited or prevented is a device that can be activated in the closed state of the box and in that this device for limiting axial displacement is configured to, in the closed state of the box, pass from an inactive state to an active state, depending on the position occupied by the output shaft or said output shaft section in said box by the simple displacement of the output shaft or the output shaft section from the or one of the insertion openings of the box towards the inside of the box to a predetermined position. In this predetermined position, any axial displacement of the output shaft or the output shaft section inside the box according to at least one direction opposite to the direction of insertion of the output shaft or the output shaft section into the box is limited or prevented. Thus, the device for limiting the axial displacement of the output shaft or the output shaft section according to at least one direction opposite to the direction of insertion of the output shaft or the output shaft section into said box is a device that can be activated by inserting the output shaft or the output shaft section into the box in the closed state of the box and automatically activated in the inserted state of the output shaft or of said output shaft section in the box beyond a predetermined position. This results in a simplification of the mounting of the output shaft and a reduction of the risk of a mounting error by the operator since no added part is necessary for the activation of the device.

According to one embodiment of the invention, at least the or one of the insertion openings of the box has from the outside towards the inside of the box at least a first cross-section referred to as the outer cross-section and a second cross-section referred to as the inner cross-section, said first cross-section, of a greater dimension than the second cross-section, houses an annular sealing gasket coaxial to said output shaft or to the output shaft section in the arranged state of said output shaft or said output shaft section in said insertion opening and the second cross-section forms a bearing for the output shaft or the output shaft section by direct contact with said output shaft or the output shaft section in the arranged state of said output shaft or said output shaft section in said opening. This arrangement allows the output shaft to be mounted a posteriori, i.e., in the closed position of the box, without harming the characteristics of quality and simplicity of implementation of the sealing of the transmission box, which generally comprises a lubricant, such as grease.

According to one embodiment of the invention, the box comprises, on the inside, at least one abutment of end of stroke against which the output shaft or the output shaft section to be limited in axial displacement is capable to bear in the activated state of the device for limiting axial displacement, so that any displacement of the output shaft or the output shaft section into the box in the direction of an insertion of the output shaft or the output shaft section into the box is prevented beyond said abutment of end of stroke. The presence of such an abutment of end of stroke enables a simplification of the task of the operator during the mounting of the output shaft on the box.

According to one embodiment of the invention, the device for limiting the axial displacement of the output shaft or the output shaft section according to at least one direction opposite to the direction of insertion of the output shaft or said output shaft section into said box is, in the activated state, entirely housed inside the box. Thus, any risk of accidental dismount of the output shaft by access to the device for limiting the axial displacement of said shaft is prevented.

According to one embodiment of the invention, the device for limiting the axial displacement of the output shaft or the output shaft section according to at least one direction opposite to the direction of insertion of the output shaft or the output shaft section into said box comprises at least a first part carried by the output shaft or said output shaft section to be limited in axial displacement and a second part housed inside the box. This simplifies the design of the device for limiting the axial displacement of the output shaft. Said first and second parts of the device for limiting axial displacement are configured to cooperate with each other by bearing contact when the output shaft or the output shaft section is in said predetermined position inside the box, such that any axial displacement of the output shaft or the output shaft section inside the box according to at least one direction opposite to the direction of insertion of the output shaft or the output shaft section into the box is limited or prevented.

According to one embodiment of the invention, at least one of the first or second parts of the device for limiting the axial displacement of the output shaft or the output shaft section according to at least one direction opposite to the direction of insertion of the output shaft or the output shaft section into said box is a part at least partially elastically deformable and said part is at least partially elastically deformable depending on the position occupied by the output shaft or said output shaft section in said box to allow, by elastic deformation of said part under the effect of the displacement of the output shaft or the output shaft section from the or one of the insertion openings of the box towards the inside of the box to the predetermined position, the passing of the device for limiting axial displacement from the inactive state to the active state. The activation may thus take place automatically by simple elastic deformation of at least one part of the device for limiting the axial displacement of the output shaft.

According to one embodiment of the invention, at least the second part of the device for limiting the axial displacement of the output shaft or the output shaft section according to at least one direction opposite to the direction of insertion of the output shaft or the output shaft section into said box, which is an elastically deformable part, has the form of a self-locking axle lock washer provided with elastically deformable inner radial tabs, the first part of the device for limiting the axial displacement of the output shaft or the output shaft section at least according to one direction opposite to the direction of insertion of the output shaft or the output shaft section into said box is formed by a segment portion of the output shaft or the output shaft section and, in the activated state of the device for limiting axial displacement, the tabs of the axle lock washer extend around the segment portion of the output shaft or the output shaft section forming the first part of the device for limiting axial displacement and occupy, in relation to said segment portion of the output shaft or of the output shaft section, an angular clamping position in which any displacement of the output shaft or the output shaft section at least according to one direction opposite to the direction of insertion of the output shaft or the output shaft section into said box is limited or prevented by buttressing of said tabs on the segment portion of the output shaft or the output shaft section. In this embodiment, the output shaft or the output shaft section to be limited in displacement is, in the activated state of the device for limiting the axial displacement of the output shaft or the output shaft, held inside the box by clamping. In other words, the first part carried by the output shaft or said output shaft section to be limited in axial displacement and the second part housed inside the box of the device for limiting the axial displacement of the output shaft can cooperate with each other for a restraint by clamping of the output shaft or the output shaft section to be limited in displacement in the activated state of the device.

As a variant, the device for limiting the axial device in axial displacement of the output shaft or the output shaft section according to at least one direction opposite to the direction of insertion of the output shaft or the output shaft section into said box may comprise at least a first part carried by the output shaft or said output shaft section to be limited in axial displacement and a second part housed inside the box and which cooperates with the first part for a retention by click-fastening of the output shaft or the output shaft section to be limited in displacement in the activated state of the device for limiting axial displacement.

According to one embodiment of the invention, the box houses a movement transmission comprising at least one rotary driving member and at least one driven member configured to be traversed by the output shaft, the or each driven member to which the rotational displacement of the driving member is capable of being transmitted being rotationally secured to the output shaft or the output shaft section that carries it.

According to one embodiment of the invention, the second part of the device for limiting the axial displacement of the output shaft or the output shaft section according to at least one direction opposite to the direction of insertion of the output shaft or the output shaft section into said box is carried by the or one of the driven members or arranged between one of the driven members and the driving member.

According to one embodiment of the invention, the box comprises an electric motor arranged outside of the box and carried by the box, this electric motor being equipped with a drive shaft that can be positioned in engagement with the movement transmission via one of the openings provided in the box, this electric motor having a surface referred to as the bearing surface that can be positioned bearing against the box in the engaged state of the drive shaft with the movement transmission, this motor being protectable by a cover that can be coupled to the box, and the transmission box comprising an elastically deformable member for holding the bearing surface of the motor in position bearing against the box, this elastically deformable member being, in the coupled state of the cover with the box, housed in the cover. Thanks to this design, the motor can be mounted on the box in the closed state of the box. The presence of an elastically deformable member enables to hold the motor in the appropriate position. The motor may be of a simplified design with a reduced space requirement. In particular, the motor may be without the fastening plate for screw fastening as disclosed in the prior art.

The invention has yet for subject matter a self-propelled machine, such as a lawnmower, comprising a transmission box, characterized in that the transmission box is of the above-mentioned type.

The invention has yet for subject matter a method for mounting a transmission box, this transmission box comprising at least two box portions that can be assembled together to pass the box from the open state to the closed state, at least one opening for the access of the inside of the box and an output shaft that can be inserted into the box through at least one of the openings referred to as the insertion opening of the box and configured to, in the inserted state in said box and in the closed state of the box, extend at least partially out of the box, this output shaft being made of a single piece or at least two shaft sections, the box further comprising, for the output shaft or at least one of the output shaft sections, at least one device for limiting the axial displacement of the output shaft or the output shaft section according to at least one direction opposite to the direction of insertion of the output shaft or the output shaft section into said box in the inserted state of the output shaft or the output shaft section in the box and in the closed state of the box, characterized in that the method comprises, after closing of the box and partial insertion of the output shaft or an output shaft section into the or one of the insertion openings of the box, a step of activation of the device for limiting axial displacement to pass the device from an inactive state to an active state in which any axial displacement of the output shaft or the output shaft section inside the box according to at least one direction opposite to the direction of insertion of the output shaft or the output shaft section into the box is limited or prevented, this activation step operating itself by simple displacement of the output shaft or the output shaft section from the or one of the insertion openings of the box towards the inside of the box to a predetermined position in which any axial displacement of the output shaft or the output shaft section inside the box according to at least one direction opposite to the direction of insertion of the output shaft or the output shaft section into the box is limited or prevented. This results in a simplified mounting of the output shaft on the box.

BRIEF DESCRIPTION OF THE DRAWINGS

The invention will be clearly understood from the reading of the following description of embodiments, with reference to the appended drawings in which.

DETAILED DESCRIPTION

The concept of the invention is described more completely hereinafter, with reference to the appended drawings, in which embodiments of the concept of the invention are shown. Similar numbers refer to similar elements on all of the drawings. However, this concept of the invention may be implemented in many different forms and should not be interpreted as being limited to the embodiments exhibited here. Instead of this, these embodiments are proposed so that this description is complete, and communicate the scope of the concept of the invention to persons skilled in the art.

A reference in all the description of a "one embodiment" means that a particular functionality, structure or feature described in relation with an embodiment is included in at least one embodiment of the present invention. Thus, the use of the expression "in one embodiment" in various locations in all of the description is not necessarily a reference to the same embodiment. Moreover, the particular functionalities, structures or features may be combined in any appropriate manner in one or more embodiments.

As mentioned above, the invention concerns a transmission box 1 intended to be installed on a self-propelled wheeled machine 20 to allow the driving in rotation of the wheels of the machine 20 from an electric motor 7 equipping the transmission box 1.

The wheeled machine 20 is here a lawnmower, but the invention may apply to other types of wheeled machines, in particular where a driver walks behind the machine 20.

Figure 1:
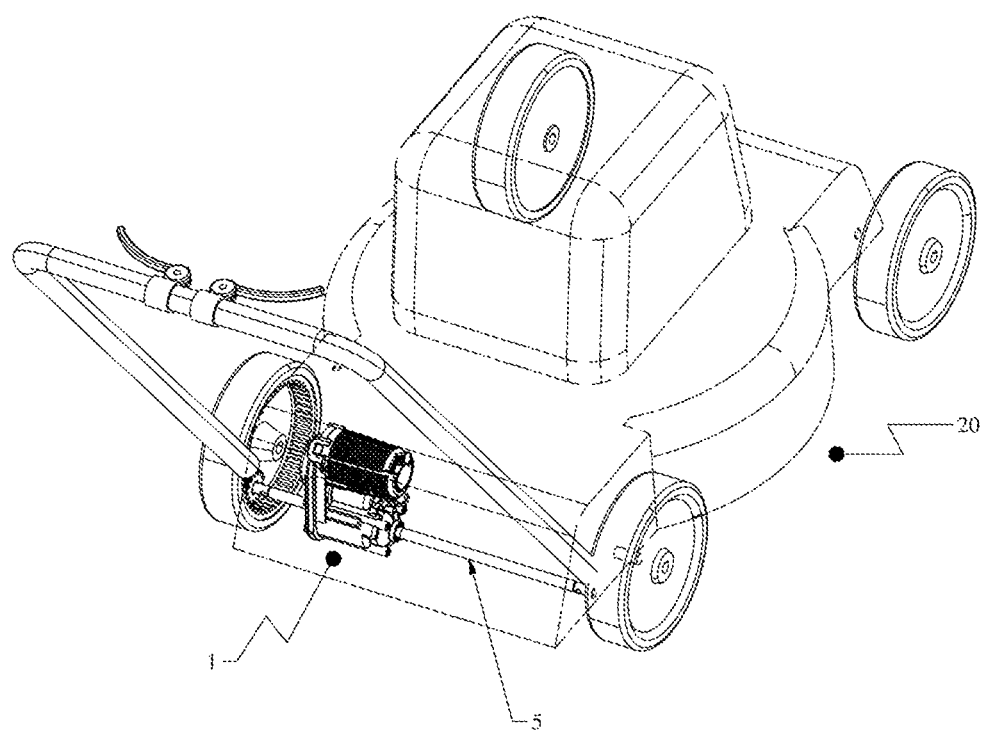
FIG. 1 represents a perspective view of a machine equipped with a transmission box according to the invention.
Figure 2A:
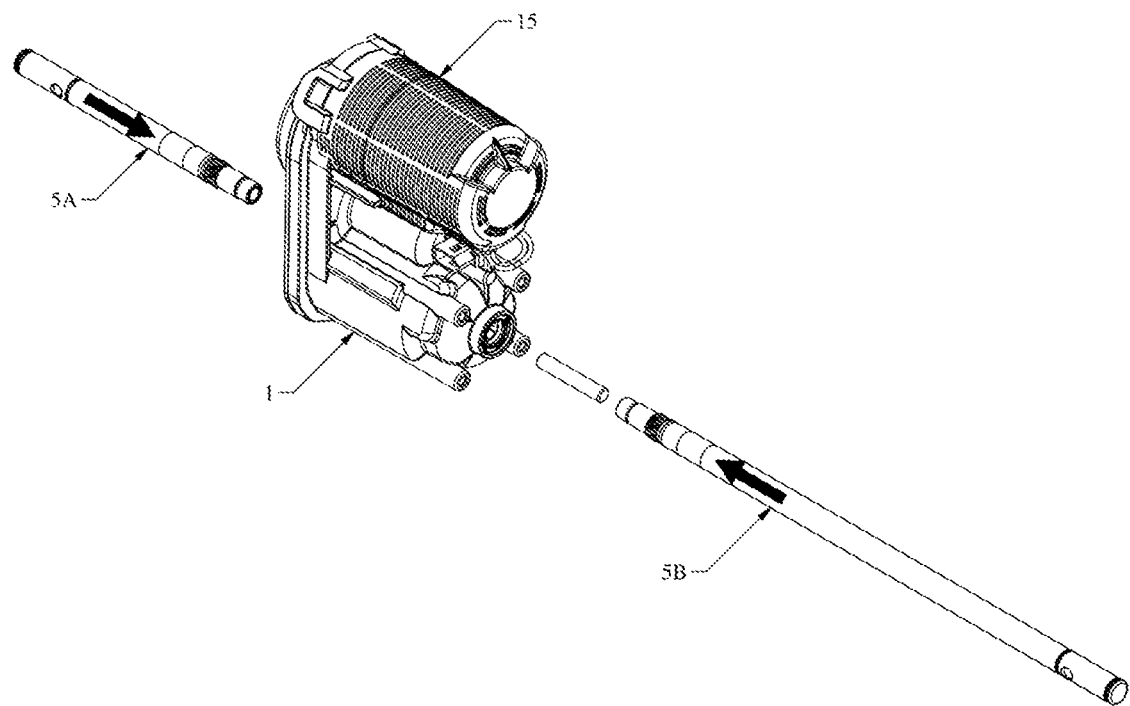
FIG. 2A represents a perspective view of a transmission box according to the invention during mounting of the output shaft made of two shaft sections on said box.
Figure 2B:
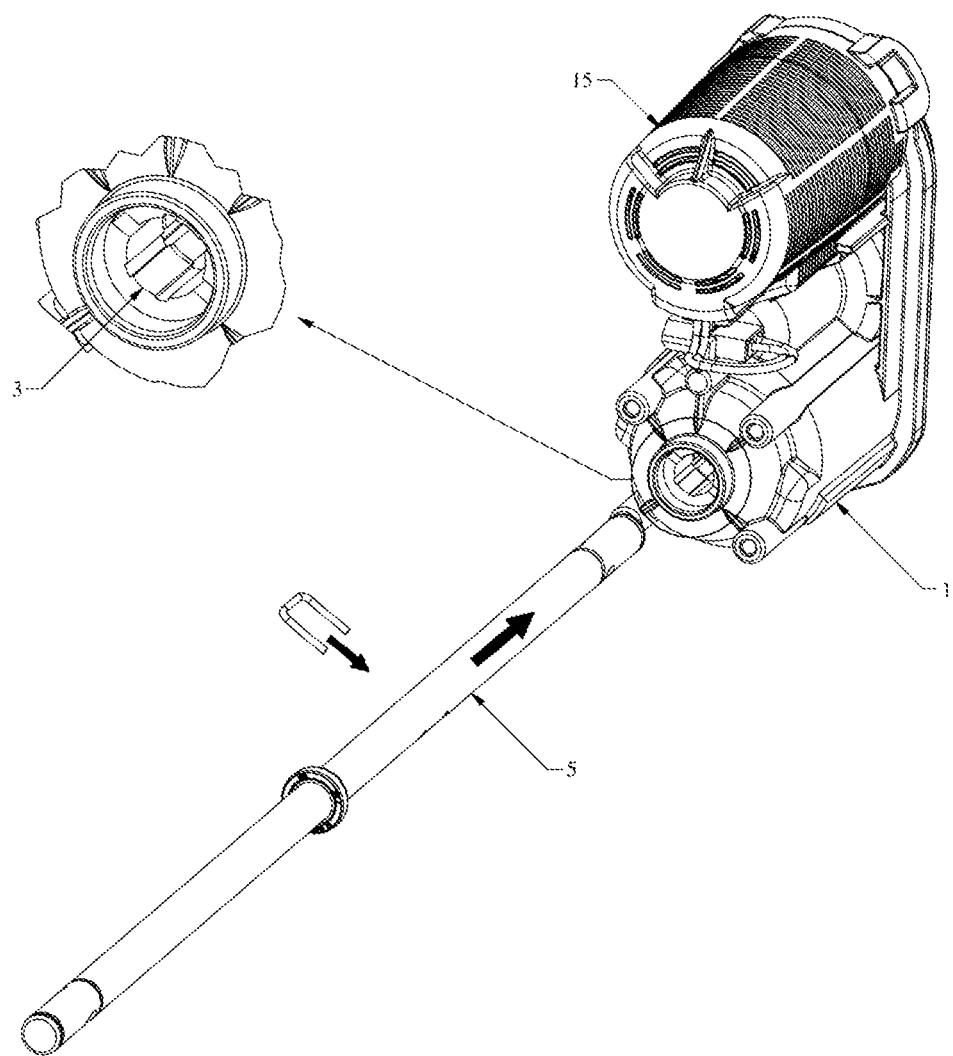
FIG. 2B represents a perspective view of a transmission box according to the invention during the mounting of the output shaft made of a single piece on said box with an associated detailed view.
Figure 3:
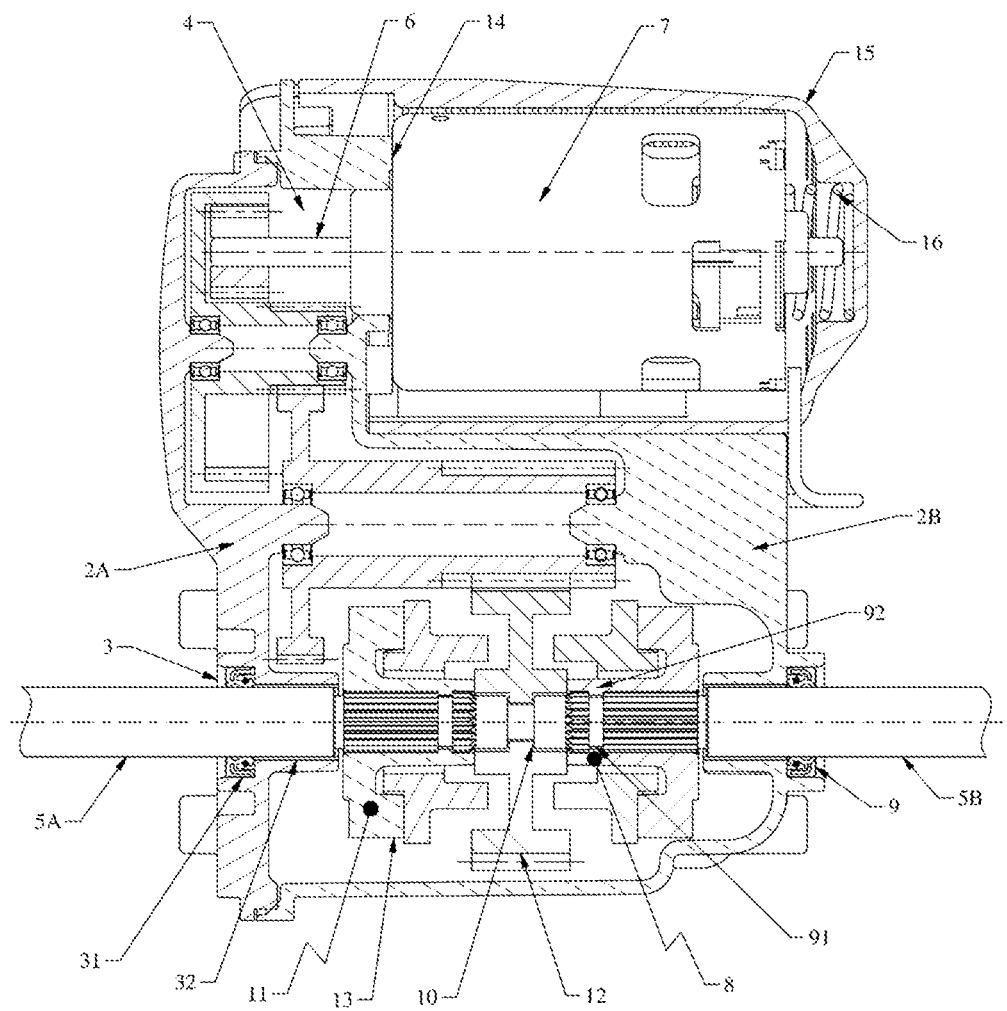
FIG. 3 represents a cross-section view of a transmission box according to the invention.
Figure 4:
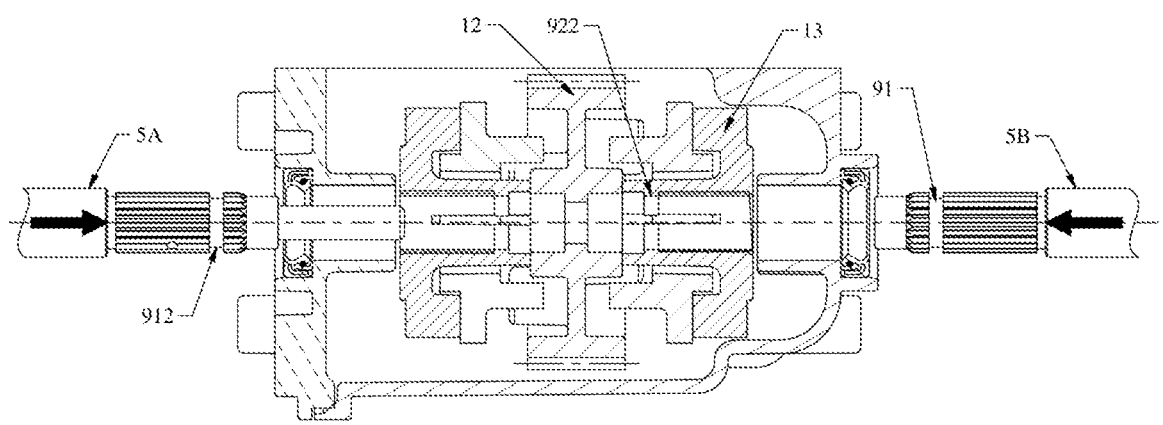
FIG. 4 represents a cross-section view of a transmission box according to the invention during the mounting of each output shaft section on said box to pass, for each shaft section, from the inactive state to the active state of the device for limiting the axial displacement of the output shaft section to be limited in displacement, the devices being in the inactive state.
Figure 5:
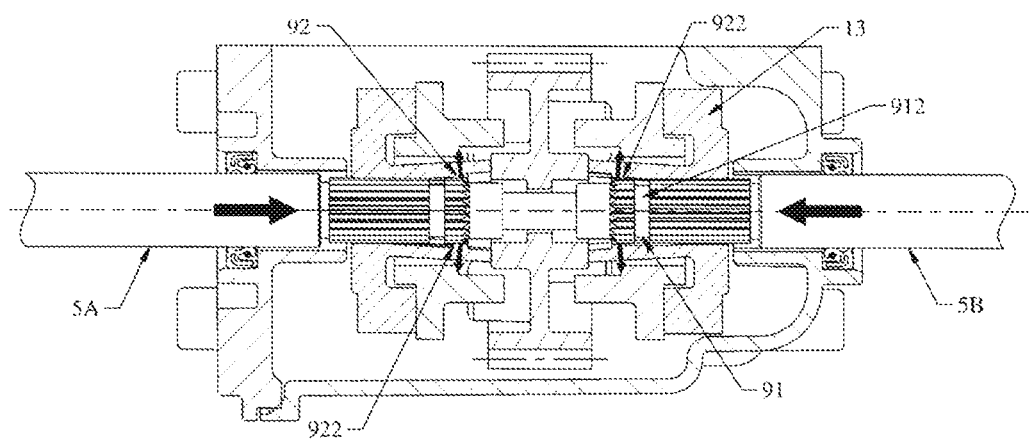
FIG. 5 represents a cross-section view of a transmission box according to the invention during the mounting of each output shaft section on said box to pass, for each shaft section, from the inactive state to the active state of the device for limiting the axial displacement of the output shaft section to be limited in displacement, the devices being in the inactive state.
Figure 6:
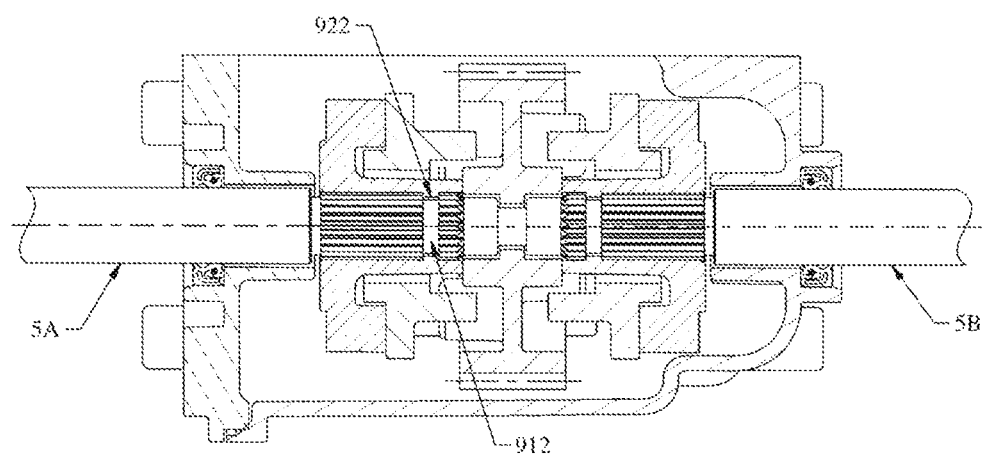
FIG. 6 represents a cross-section view of a transmission box according to the invention during the mounting of each output shaft section on said box to pass, for each shaft section, from the inactive state to the active state of the device for limiting the axial displacement of the output shaft section to be limited in displacement, the devices being in the active state.
Figure 7:
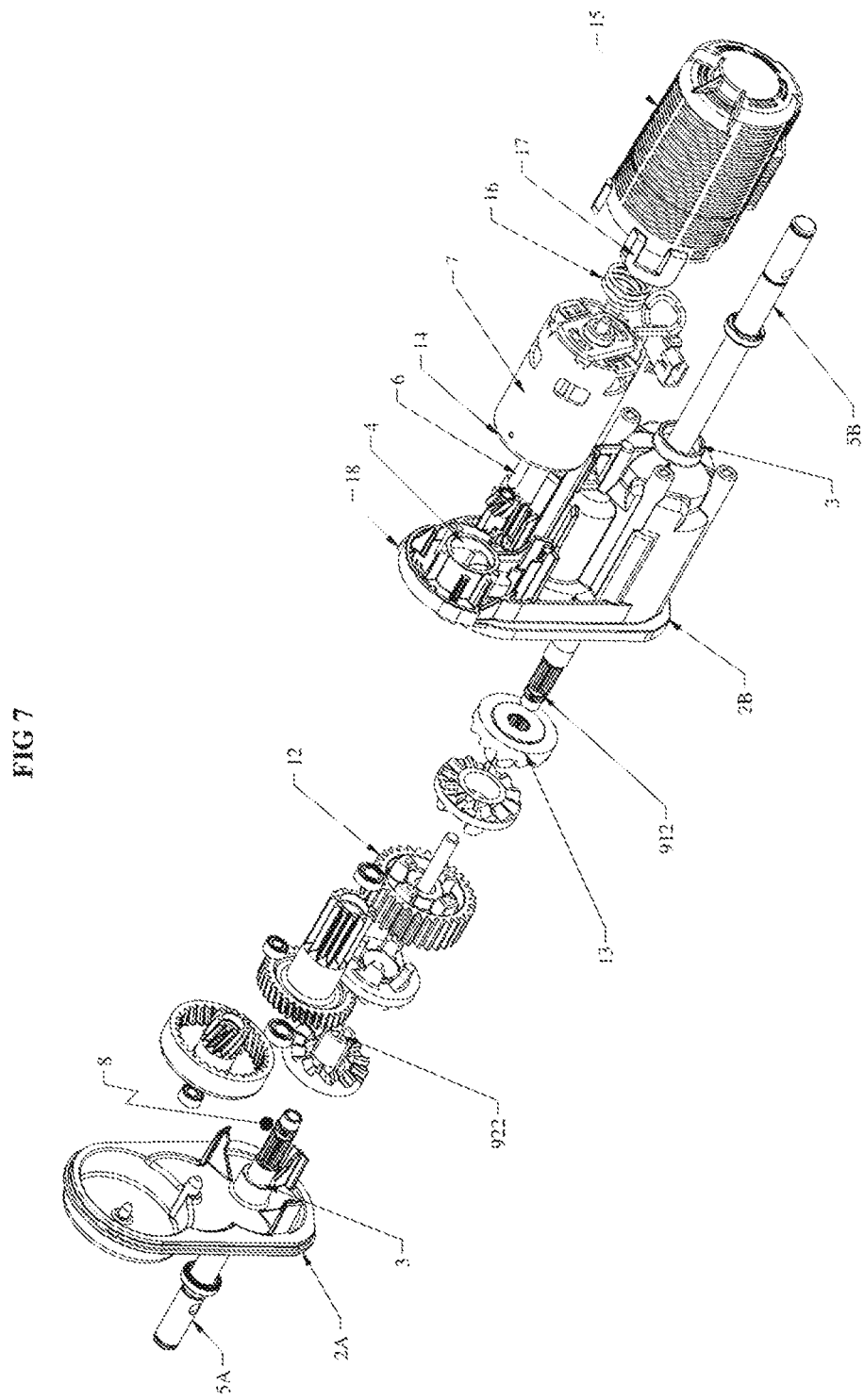
FIG. 7 represents in the form of an exploded perspective view of the components of a transmission box according to the invention.
Figure 8:
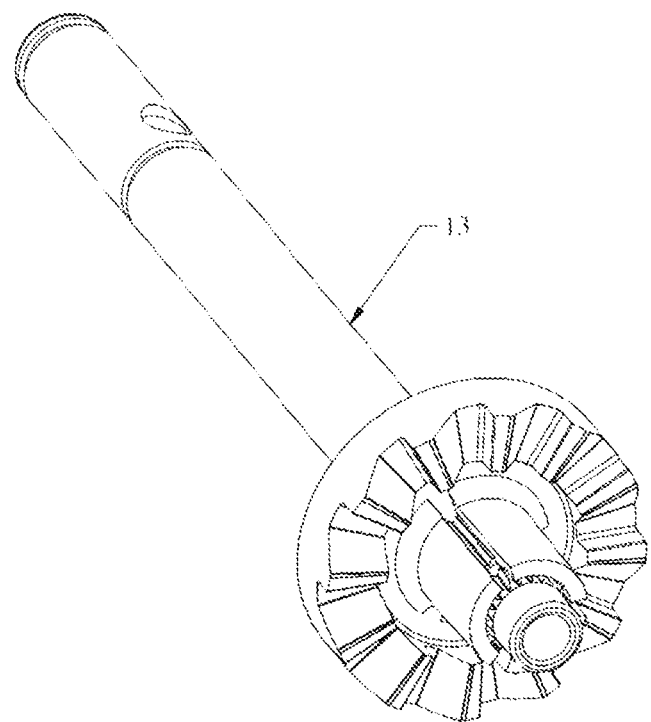
FIG. 8 represents a partial perspective view of a driven member of the movement transmission equipping the box in a state in engagement with an output shaft section.
Figure 9:
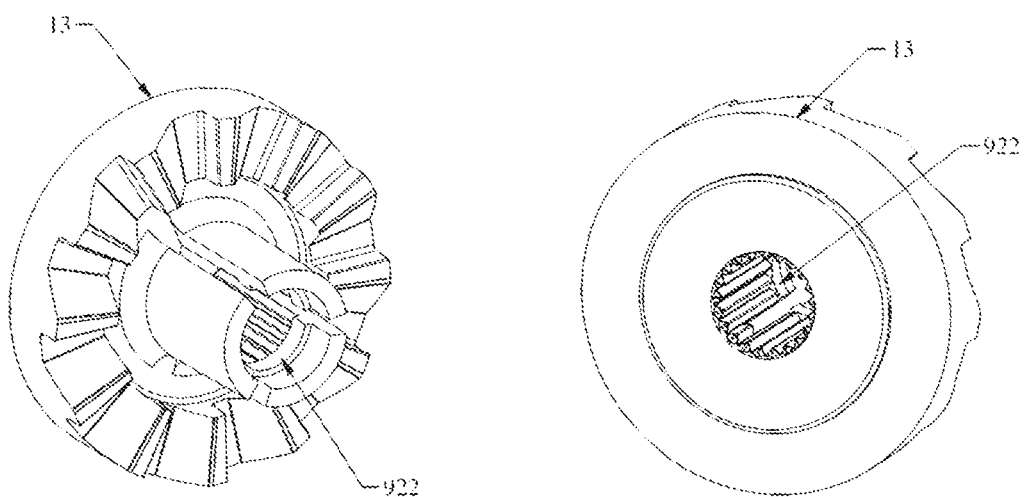
FIG. 9 represents in the form of two perspective views of a driven member of the movement transmission.

The transmission box 1 is generally arranged on the drive shaft in rotation of the wheels of the machine 20 as represented in FIG. 1, this shaft being referred to hereinafter as the output shaft 5 of the box 1. This output shaft 5 extends therefore at least partially out of the box 1. This output shaft 5 may be made of a single piece, or of two shaft sections 5A, 5B connected between them by a connecting element for the free rotation mounting of the shaft sections 5A, 5B in relation one to each other, in order to enable a differential function of the transmission box 1.

The box 1 comprises at least two box portions 2A, 2B such as a shell and a lid, held together assembled one to each other by bonding and/or click-fastening and/or welding, for example by ultrasonic welding in the closed state of the box 1, said box portions delimiting a cavity inside which a movement transmission 11 may be housed.

This movement transmission 11 allows the transmission of rotational movement of the drive shaft 6 of the electric motor 7 to the output shaft 5 driving the wheels of the machine 20.

The box 1 comprises several openings to allow the access to the cavity delimited by the box.

The output shaft 5 is at least partially insertable into this box through at least one opening 3 referred to as the insertion opening of the box 1. Thus, the output shaft 5 is inserted through one of the openings of the box 1 when this output shaft 5 is made of a single piece or through one of the insertion openings 3 of the box for one of the shaft sections 5A or 5B and through the other of the insertion openings 3 of the box for the other of the shaft sections 5A or 5B when the output shaft is made of at least two shaft sections 5A and 5B.

The insertion openings 3 of the box are arranged opposite each other on the box 1.

When the output shaft 5 is made of a single piece, the output shaft 5 is inserted via the insertion opening 3 into the box 1 and extends partially out of the box 1 via the opening of the box 1 provided opposite the insertion opening 3.

The transmission box 1 further comprises, for the output shaft 5 or at least one of the output shaft sections 5A or 5B, in this instance for each output shaft section 5A or 5B, at least one device 8 for limiting the axial displacement of the output shaft 5 or the output shaft section 5A or 5B according to at least one direction opposite to the direction of insertion of the output shaft 5 or the output shaft section 5A or 5B into said box 1 in the inserted stated of the output shaft or the output shaft section 5A or 5B in the box 1 and in the closed state of the box 1.

Thus, when the output shaft 5 is made of two shaft sections 5A and 5B, the box 1 comprises at least two devices 8 for limiting the axial displacement of an output shaft section, i.e., at least one per output shaft section.

Generally, the device 8 for limiting the axial displacement of an output shaft section is identical from one shaft section to another, that is why, in the following, it will only be described for one shaft section each time.

In a characteristic manner of the invention, this device 8 for limiting axial displacement can be activated in the closed state of the box to pass from an inactive state in which any axial displacement of the output shaft 5 or the output shaft section in the box 1 according to at least one direction opposite to the direction of insertion of the output shaft 5 or the output shaft section into the box is permitted to allow, if necessary, a complete removal of the output shaft 5 or the output shaft section 5A or 5B from the box in an active state in which any axial displacement of the output shaft or the output shaft section in the box according to at least one direction opposite to the direction of insertion of the output shaft 5 or the output shaft section into the box is limited or prevented. Thanks to the fact that this device can be activated in the closed stated of the box 1, it is thus possible to insert and hold the output shaft inside the box 1 in the closed state of the box 1.

This device 8 for limiting axial displacement is configured to, in the closed state of the box 1, pass from an inactive state to an active state depending on the position occupied by the output shaft 5 or said output shaft section 5A or 5B in said box 1. In particular, this device 8 for limiting axial displacement is configured to, in the closed state of the box 1, switch from an inactive state to an active state by simply displacing the output shaft 5 or the output shaft section 5A or 5B from the or one of the insertion openings 3 of the box 1 towards the inside of the box 1 to a predetermined position in which any axial displacement of the output shaft 5 or the output shaft section 5A or 5B inside the box 1 according to at least one direction opposite to the direction of insertion of the output shaft 5 or the output shaft section 5A or 5B into the box 1 is limited or prevented.

Thus, the step of activation of the device operates itself by simply displacing the output shaft 5 or the output shaft section 5A or 5B to be limited in displacement from the or one of the insertion openings 3 of the box towards the inside of the box 1 to a predetermined position inside the box 1 in which any axial displacement of the output shaft 5 or the output shaft section 5A or 5B inside the box 1 according to at least one direction opposite to the direction of insertion of the output shaft 5 or the output shaft section 5A or 5B into the box 1 is limited or prevented.

In the examples represented, the box 1 internally comprises at least one abutment 10 of end of stroke against which the output shaft 5 or the output shaft section 5A; 5B to be limited in axial displacement is capable of bearing in the activated state of the device 8 for limiting axial displacement such that any displacement of the output shaft 5 or the output shaft section 5A; 5B in the box 1 in the direction of insertion of the output shaft 5 or the output shaft section 5A; 5B into the box 1 is prevented beyond said abutment 10 of end of stroke.

At least this end of stroke position of the output shaft 5 or the output shaft section 5A or 5B inside the box 1 corresponds to the predetermined position of the output shaft 5 or the output shaft section inside the box 1 in which any axial displacement of the output shaft 5 inside the box 1 according to at least one direction opposite to the direction of insertion of the output shaft 5 or of the output shaft section 5A or 5B into the box 1 is limited or prevented.

In the examples represented, the device 8 for limiting axial displacement is, in the activated state, entirely housed inside the box 1 to prevent any accidental deactivation of the device 8 for limiting axial displacement which could allow a removal of the output shaft 5 or at least one of the output shaft sections from the transmission box 1.

In the examples represented, the device 8 for limiting the axial displacement of the output shaft 5 or the output shaft section 5A or 5B according to at least one direction opposite to the direction of insertion of the output shaft 5 or the output shaft section 5A or 5B into said box 1 comprises at least a first part 91 carried by the output shaft 5 or said output shaft section 5A or 5B to be limited in axial displacement and a second part 92 housed inside the box 1. These first and second parts may have many different forms, according to the embodiment of the device 8 for limiting axial displacement.

Generally, at least one of the first or second parts 91, 92 of the device 8 for limiting the axial displacement of the output shaft 5 or the output shaft section 5A; 5B according to at least one direction opposite to the direction of insertion of the output shaft 5 or the output shaft section 5A; 5B into said box 1 is a part at least partially elastically deformable. This part is at least partially elastically deformable depending on the position occupied by the output shaft 5 or said output shaft section 5A; 5B in said box 1 to allow, by elastic deformation of said part under the effect of the displacement of the output shaft 5 or the output shaft section 5A; 5B from the or one of the insertion openings 3 of the box 1 towards the inside of the box 1 to the predetermined position, the passing of the device 8 for limiting axial displacement from the inactive state to the active state.

Figure 14A:
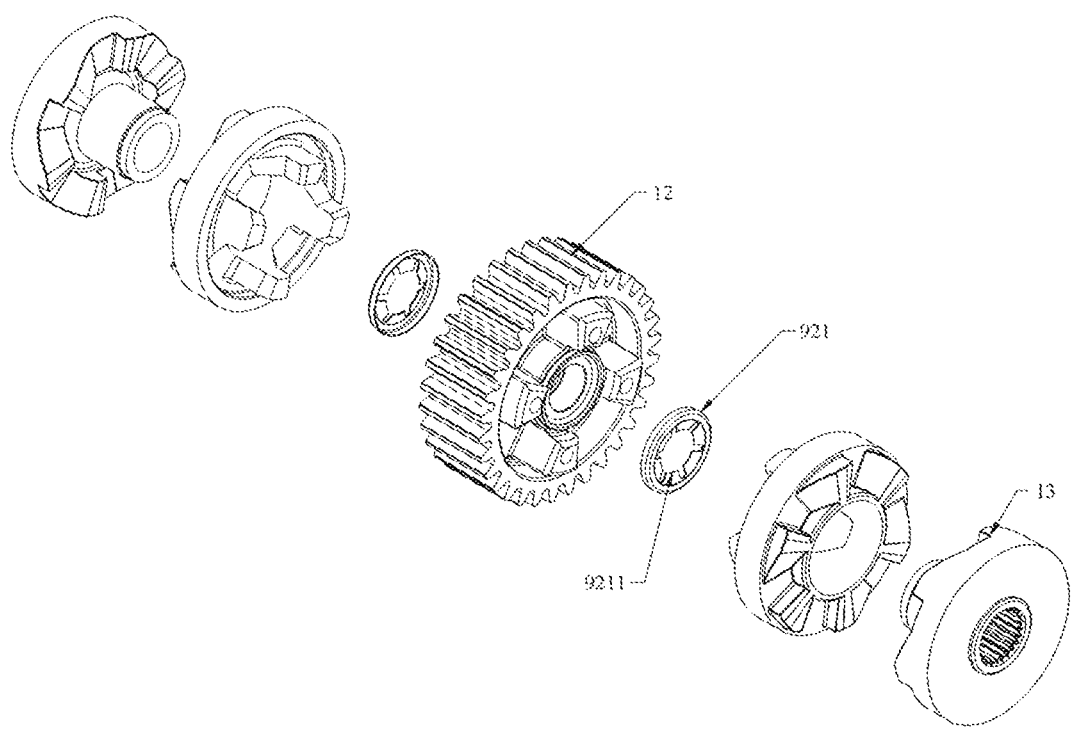
FIG. 14A represents a partial perspective view, in exploded position of the elements, of a movement transmission equipping a transmission box according to the invention.
Figure 14B:
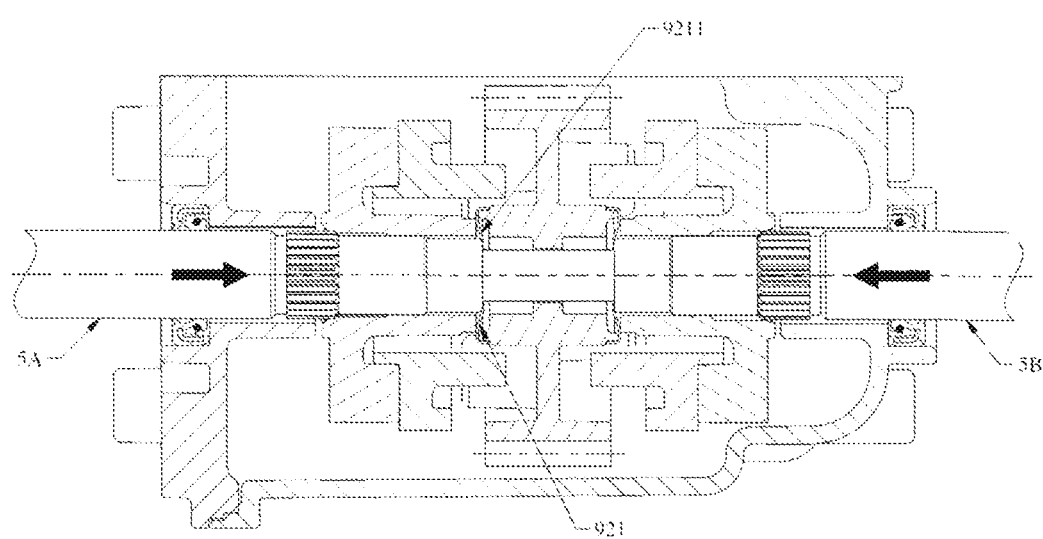
FIG. 14B represents a cross-section view of a transmission box according to the invention during the mounting of each output shaft section on said box to pass, for each shaft section, from the inactive state to the active state of the device for limiting the axial displacement of the output shaft section to be limited in displacement, the devices being in the inactive state.
Figure 14C:
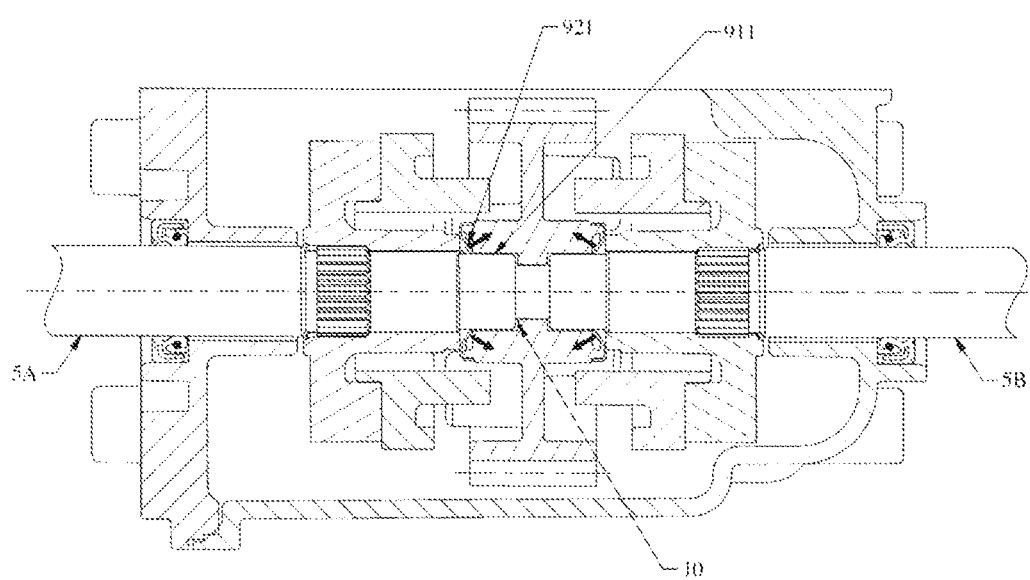
FIG. 14C represents a cross-section view of a transmission box according to the invention during the mounting of each output shaft section on said box to pass, for each shaft section, from the inactive state to the active state of the device for limiting the axial displacement of the output shaft section to be limited in displacement, the devices being in the active state.
Figure 15:
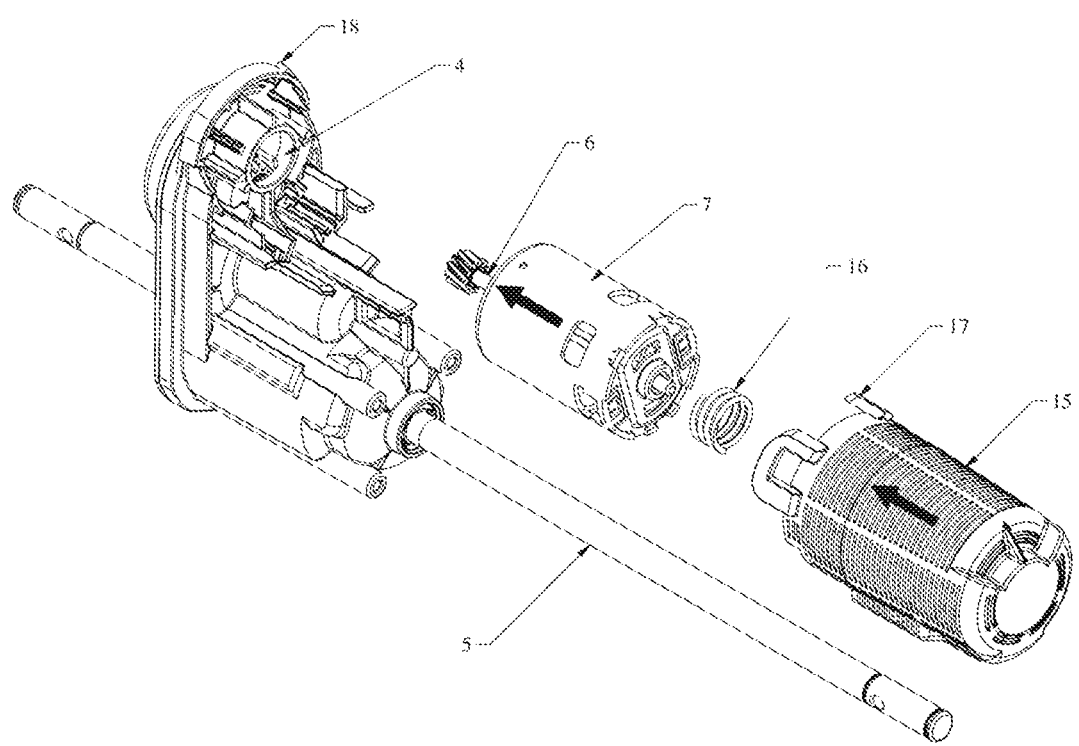
FIG. 15 represents a perspective view of a transmission box during the mounting of the motor and the cover on the box, during the approach of the motor and the cover of the box.
Figure 16:
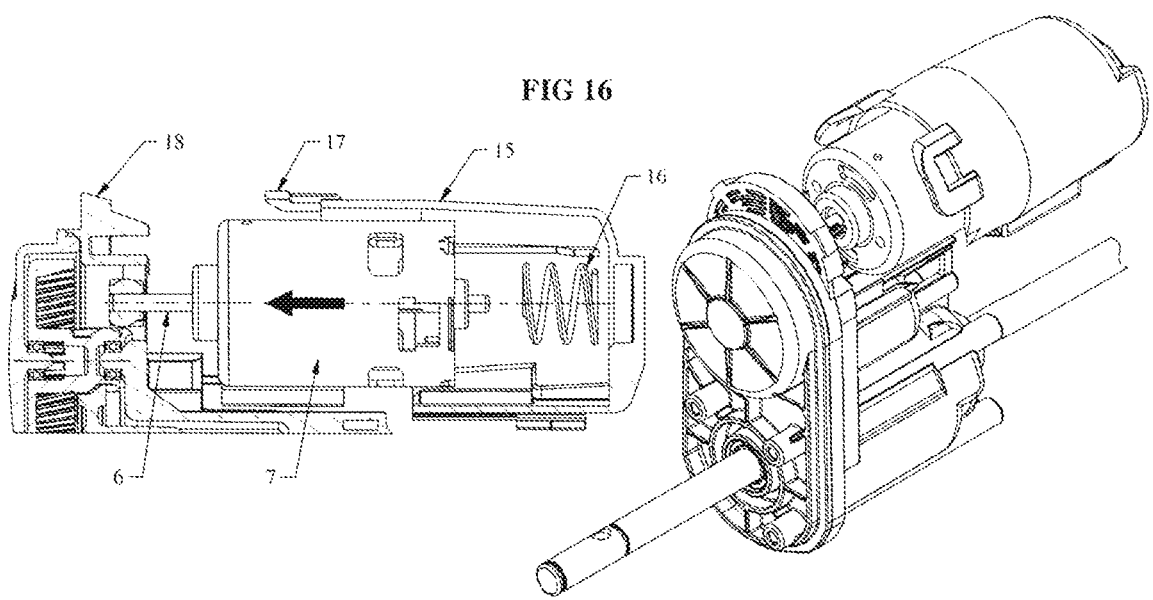
FIG. 16 represents in the form of a perspective view and a cross-section view of the mounting of the motor and the cover on the box during the approach of the motor and the cover of the box.
Figure 17:
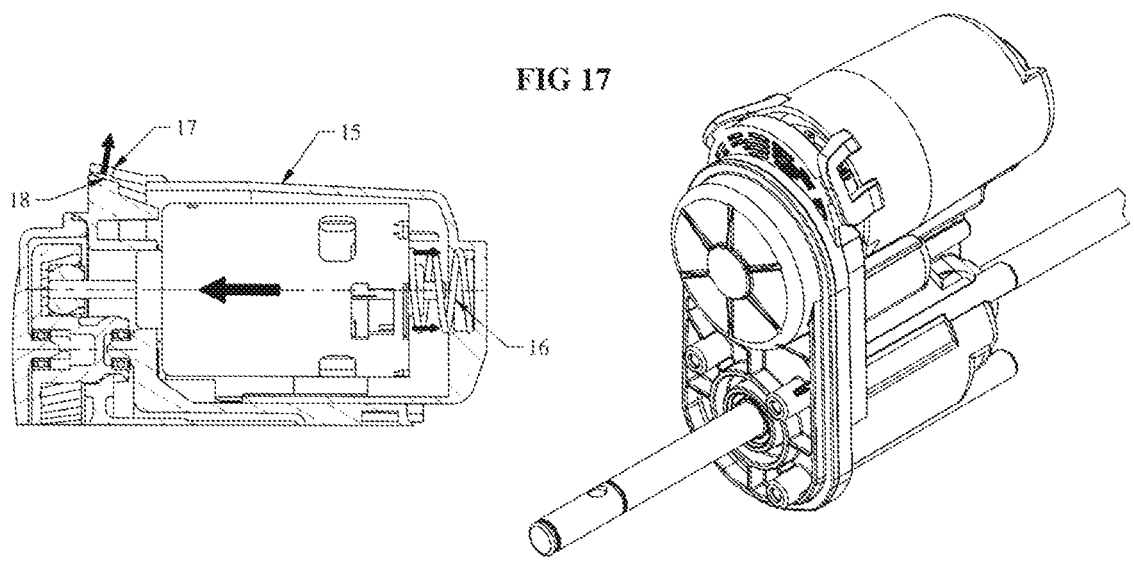
FIG. 17 represents in the form of a perspective view and a cross-section view of the mounting of the motor and the cover on the box in the closer state of the motor and the cover of the box.
Figure 18:
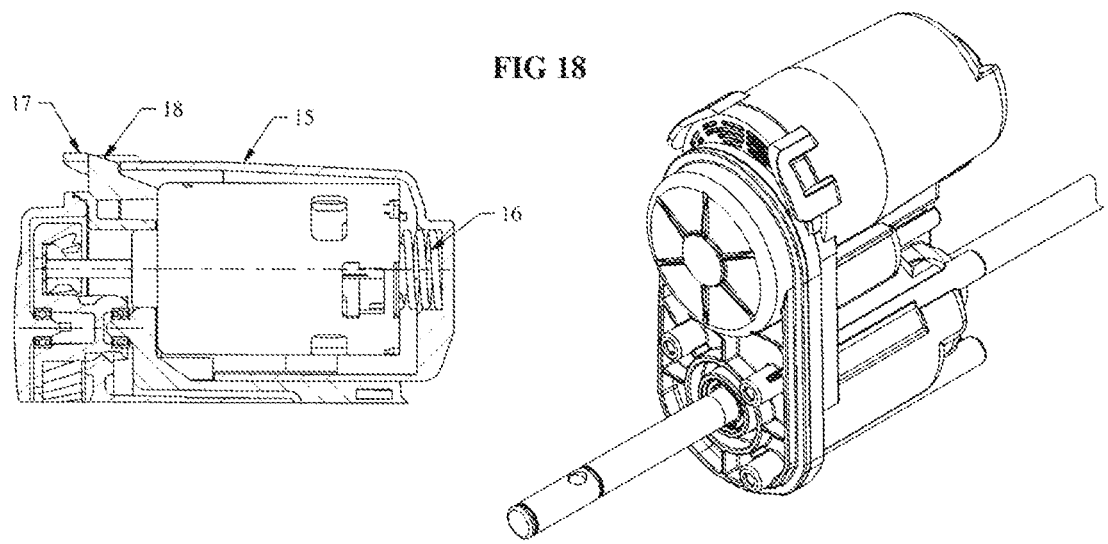
FIG. 18 represents in the form of a perspective view and a cross-section view of the mounting of the motor and the cover on the box in the mounted state of the motor and the cover of the box.

In the example represented in FIGS. 14A to 14C, the output shaft 5 is formed from two shaft sections and, for each shaft section, the device 8 for limiting axial displacement is active as a result of clamping the output shaft section with which it is associated.

The two active devices 8 for limiting axial displacement, one on one shaft section, the other on the other shaft section are identical, so that only one will be described hereinafter.

It should be noted that this embodiment can apply in a similar manner to the output shaft when the latter is made of a single piece.

In this embodiment, it is the second part 92 of the device 8 for limiting axial displacement, i.e., the part of the device 8 for limiting axial displacement that is housed permanently inside the box 1 in the closed state of the box 1 that is elastically deformable.

In the example represented in FIGS. 14A to 14C, this second part 92 of the box 8 for limiting axial displacement has the form of a self-locking axle lock washer 921, provided with elastically deformable inner radial tabs 9211.

This axle lock washer can be a commercial washer.

This washer is held inside the box, on the path followed by the output shaft section inside the box after its insertion into the box through one of the insertion openings 3 of the box 1. This retention may operate itself using the constitutive parts of the movement transmission 11 and will be described hereafter.

The first part 91 of the device 8 for limiting the axial displacement of the output shaft section is formed by a portion 911 of the output shaft section. This portion 911 of the output shaft section comes to insert itself into the washer 921 during its introduction into the box 1 and generates, while it is being introduced, a deformation of the tabs 9211 as illustrated in FIGS. 14B and 14C. Thus, in the activated state of the device 8 for limiting axial displacement, the tabs 9211 of the washer 921 extend themselves around the segment portion 911 of the output shaft section 5A or 5B forming the first part 91 of the device 8 for limiting axial displacement and occupy, in relation to said segment portion 911 of the output shaft section 5A or 5B, an angular clamping position in which any displacement of the output shaft section according to a direction opposite to the direction of insertion of the output shaft section into said box 1 is limited or prevented by buttressing of said tabs 9211 on the segment portion 911 of the output shaft section 5A or 5B.

It is noted that in the examples represented, in the activated state of the device 8 for limiting axial displacement, the leading end of the output shaft section is in a bearing position against an abutment 10 of a managed end of stroke using parts of the movement transmission 11, so that an insertion of the shaft section into the inside of the box, beyond this position, is impossible.

As mentioned above, a similar result could have been achieved with an output shaft made of a single piece. In this case, a single washer would have been necessary, this washer cooperating with the abutment of end of stroke to limit an axial displacement of the output shaft in both directions.

As a variant, the device 8 for limiting axial displacement may be active by click-fastening. Such is the case of the embodiments represented in FIGS. 3 to 13.

In each of these embodiments, again the second part 92 of the device 8 for limiting axial displacement is carried by one of the parts of the movement transmission 11 or inserted between parts of said movement transmission.

In practice, this movement transmission 11 comprises at least one rotary driving member 12, such as a toothed wheel, and at least one driven member 13, such as a centrally recessed dog clutch element. This driving member 12 and this or these driven members 13 are configured to be traversed by the output shaft.

When the output shaft is made of a single piece, a single driven member 13 is provided. When the output shaft 5 is made of two output shaft sections 5A and 5B, two driven members 13 are provided, i.e., one for each output shaft section.

Independently to the design of the output shaft 5, the or each driven member 13 to which the rotational movement of the driving member 12 is capable of being transmitted is rotationally secured to the output shaft 5 or the output shaft section 5A or 5B that carries it. The rotational movement is transmitted between the driving and driven members by means of a dog clutch. Such a movement transmission is well known to persons skilled in the art in this field and is described in particular in patent FR 3 036 450. The rotational secured attachment of the output shaft or a section of the output shaft with the driven member 13 can operate itself using splines carried by the output shaft or the output shaft section, these splines being able to come in engagement with longitudinal grooves provided at the central recess of the driven member 13, in the inserted state of the output shaft or of the output shaft section is into the central recess of the driven member 13.

In the examples represented, in particular in FIGS. 4 to 13, the or each driven member 13, which is a centrally recessed part so that the shaft or an output shaft section pass through it, comprises at the level of its central recess, a sleeve. This sleeve may, in certain embodiments, be an elastically deformable sleeve, as illustrated for example in FIGS. 4 to 6. In this embodiment, generally, the second part 92 of the device 8 for limiting the displacement of the output shaft or an output shaft section is carried by said driven member 13 and is formed by an elastically deformable part of said driven member 13. Thus, in the example represented in FIGS. 4 to 5, the sleeve of the driven member 13 is an elastically deformable sleeve. This sleeve is provided on the inside with a protruding portion 922. This protruding portion 922 is configured to cooperate by interlocking with a recessed portion 912 provided on the output shaft section to be limited in displacement.

This recessed portion 912 provided on the output shaft section to be limited in axial displacement is formed by an annular groove provided on the outer circumferential surface of the output shaft or the output shaft section to be limited in axial displacement. The protruding portion of the sleeve is formed by a continuous or discontinuous inner circumferential rib of said sleeve.

Generally, and as represented, the elastically deformable sleeve is, to allow its elastic deformation, split longitudinally on at least part of its length from one of its ends, so as to form a plurality of elastically deformable axial fingers.

Thus, when an output shaft section is inserted into the box, through an insertion opening 3 of the box, the fingers of the sleeve tend to move away from each other, under the effect of the insertion of the shaft or the shaft section into said sleeve, before moving back towards each other when the protruding portion 922 of the driven element comes to insert itself into the recessed portion 912 of the output shaft section to be limited in axial displacement. This position materializes the predetermined activation position of the device 8 for limiting axial displacement.

Again, in this position, the leading end of the output shaft section to be limited in axial displacement may be in bearing contact against an abutment 10 of end of stroke, although this is not mandatory. The details of the driven member 13 as described above can be seen more particularly in FIG. 9. It has to be noted that the embodiment described above can apply itself in a similar manner to an output shaft made of a single piece.

In the example above, the second part 92 of the device 8 for limiting axial displacement is carried by the or one of the driven members 13 and is an elastically deformable part at the insertion passage of the output shaft or the section of the output shaft to be limited in displacement. The same applies to the examples of FIGS. 12A to 13, where a driven member 13 at least partially elastically deformable is in each case provided interiorly with an internal circumferential narrowed segment represented in 925 in the figures.

Figure 12A:
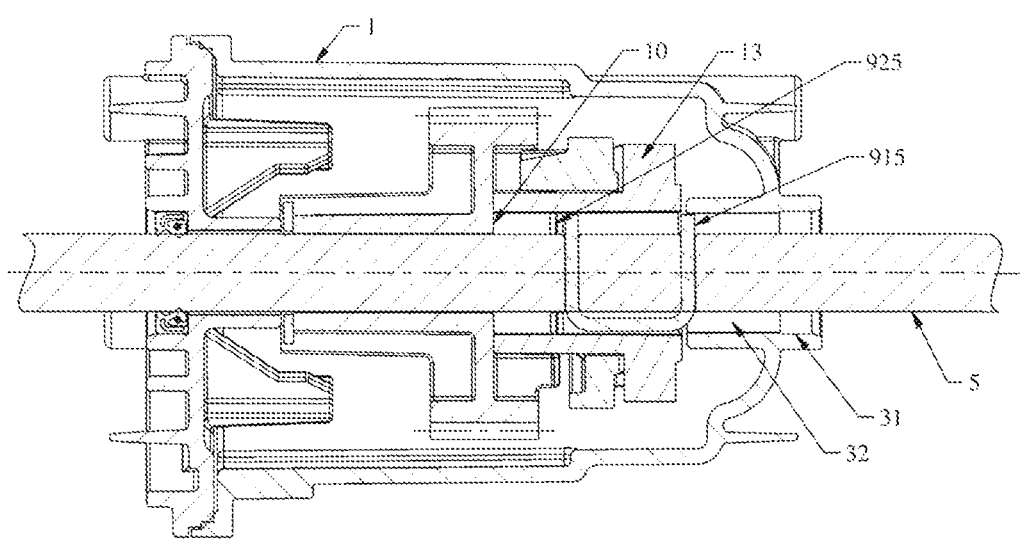
FIG. 12A represents a cross-section view of a transmission box according to the invention during the mounting of the output shaft made of a single piece on said box to pass from the inactive state to the active state of the device for limiting the axial displacement of the output shaft to be limited in displacement, the device being in the inactive state.
Figure 12B:
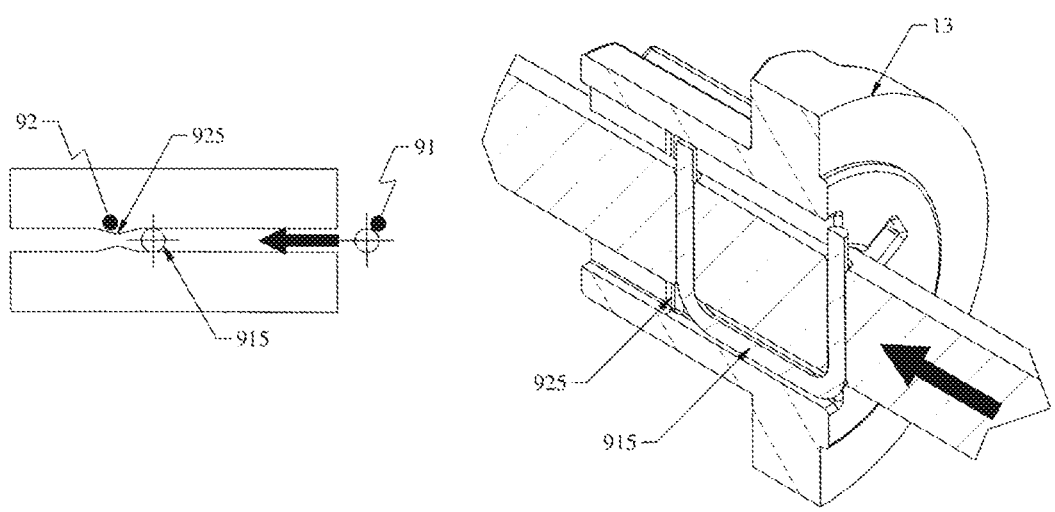
FIG. 12B represents in the form of two detailed views of the device for limiting axial displacement of FIG. 12A.
Figure 13:
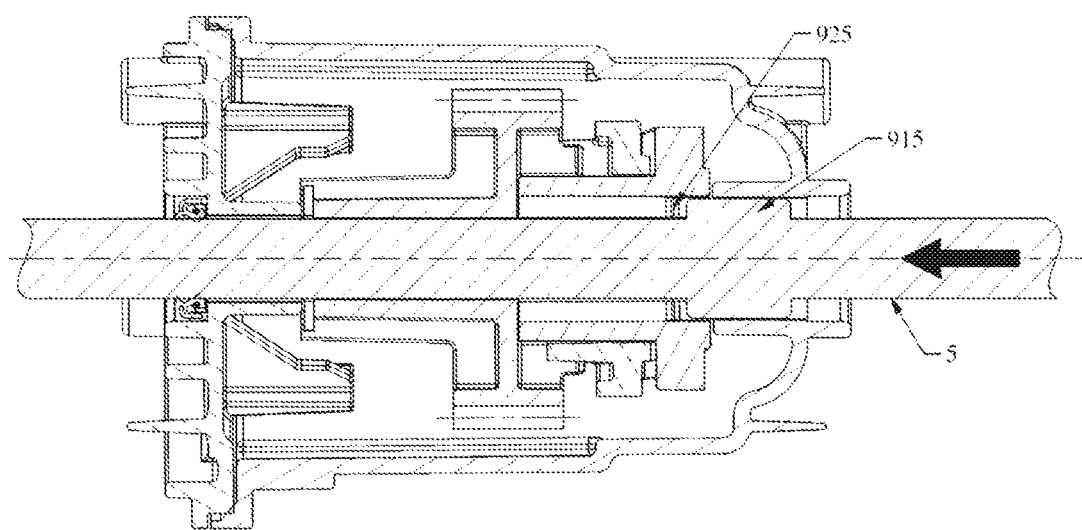
FIG. 13 represents a cross-section view of a transmission box according to the invention during the mounting of the output shaft made of a single piece on said box to pass from the inactive state to the active state of the device for limiting the axial displacement of the output shaft to be limited in displacement, the device being in the inactive state.

The output shaft is fitted with a materialized enlargement 915 in the examples of FIGS. 12A and 12B by the ends of the legs of a staple mounted on the output shaft and, in the example of FIG. 13, by a bulge in said output shaft. This enlargement generates, during the insertion of the output shaft to be limited in axial displacement into the central recess of the driven member 13, at the level of the circumferential narrowing 925 of the driven member 13, a deformation of the driven member 13, in the direction of an enlargement, at the insertion passage of the enlargement of the output shaft before a tightening of said member 13 behind the enlargement passage or an enlargement of the output shaft, so that any axial displacement of the output shaft in a direction opposite to the direction of insertion of the output shaft into the box is limited or prevented. Again, in this embodiment, an abutment 10 of end of stroke may be provided. It has to be noted that the embodiment described above can apply itself in a similar manner to an output shaft made of two shaft sections.

Figure 10A:
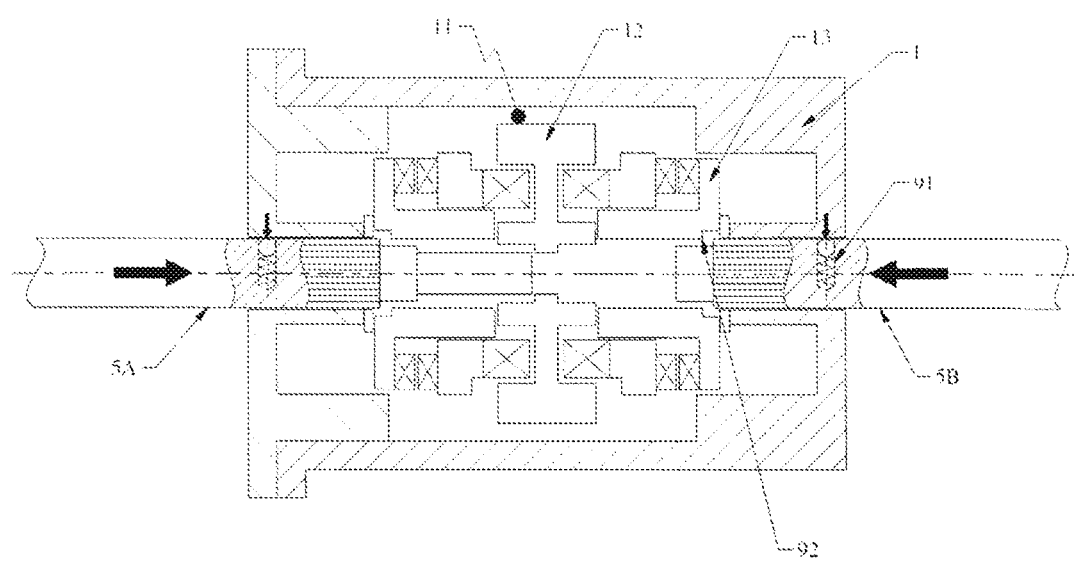
FIG. 10A represents a cross-section view of a transmission box according to the invention during the mounting of each output shaft section on said box to pass, for each shaft section, from the inactive state to the active state of the device for limiting the axial displacement of the output shaft section to be limited in displacement, the devices being in the inactive state.
Figure 10B:
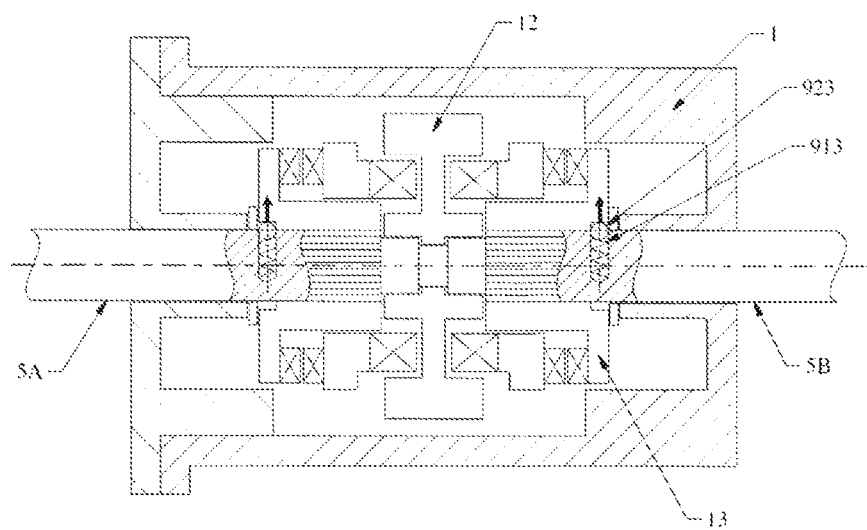
FIG. 10B represents a cross-section view of a transmission box according to the invention during the mounting of each output shaft section on said box to pass, for each shaft section, from the inactive state to the active state of the device for limiting the axial displacement of the output shaft section to be limited in displacement, the devices being in the active state.

As a variant, in yet another embodiment of the invention, the second part 92 of the device 8 for limiting axial displacement may be a non-deformable part carried by the or one of the driven members 13, as in particular in the example represented in FIGS. 10A and 10B. In this embodiment, it is the first part 91 of the device 8 for limiting axial displacement carried by the output shaft 5 or the output shaft section to be limited in axial displacement that is elastically deformable. Thus, in the example represented in FIGS. 10A and 10B, each output shaft section is equipped with a spring-loaded ball 913, this ball 913 coming to insert inside a groove 923, at least part of which is provided in the driven member 13, in the inserted state of the output shaft section in said box 1. This position of the output shaft section in which the ball is in the groove materializes the predetermined position in which any axial displacement of the output shaft section according to at least one direction opposite to the direction of insertion of the output shaft section 5A or 5B into the box is limited or prevented.

Again, it is noted that in this embodiment, an abutment 10 of end of stroke for the leading end of the output shaft section is provided, even if it is not indispensable. This embodiment can apply itself in a similar manner to a shaft made of a single piece.

Figure 11A:
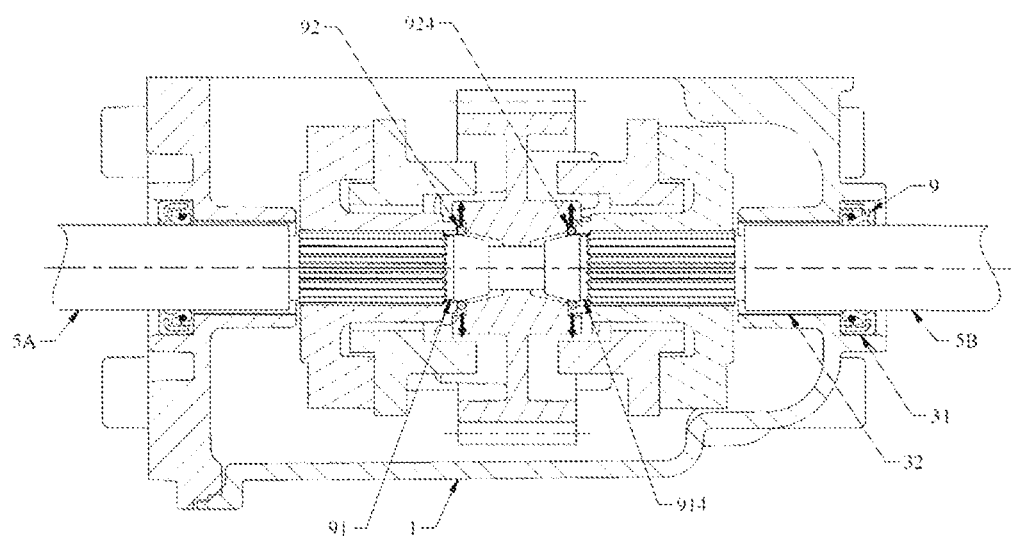
FIG. 11A represents a cross-section view of a transmission box according to the invention during the mounting of each output shaft section on said box to pass, for each shaft section, from the inactive state to the active state of the device for limiting the axial displacement of the output shaft section to be limited in displacement, the devices being in the inactive state.
Figure 11B:
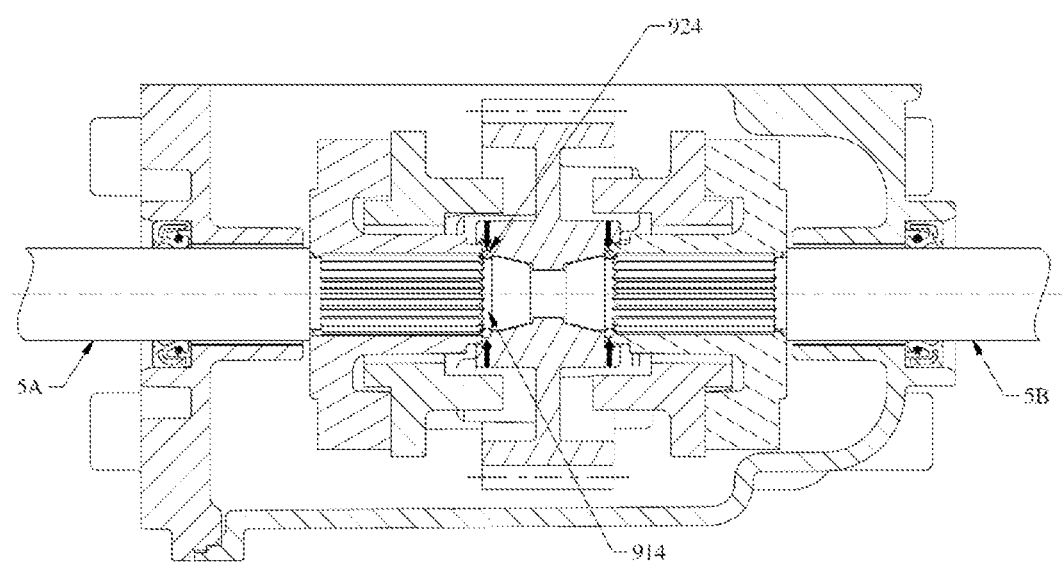
FIG. 11B represents a cross-section view of a transmission box according to the invention during the mounting of each output shaft section on said box to pass, for each shaft section, from the inactive state to the active state of the device for limiting the axial displacement of the output shaft section to be limited in displacement, the devices being in the active state.

FIGS. 11A and 11B illustrate an embodiment of the invention in which the second part 92 of the device 8 for limiting the axial displacement of the output shaft section to be limited in axial displacement is arranged between one of the driven members 13 and the driving member 12.

This second part 92 takes here the form of an elastically deformable circular snap ring 924. This snap ring 924 is traversed by the output shaft section during its insertion into the box and deforms itself during the insertion passage until coming to house itself in an outer circumferential groove 914 of the output shaft section. This position of the snap ring 924 in the groove 914 materializes the predetermined position in which any axial displacement of the output shaft section to be limited in axial displacement according to at least one direction opposite to the direction of insertion of the output shaft section 5A or 5B into the box is limited or prevented. Again, this embodiment can apply itself in a similar manner to a shaft in the form of two shaft sections.

Of course, in other embodiments of the invention, it is possible de provide that both the first part and the second part of the device 8 for limiting axial displacement are elastically deformable.

As a result of the above, independently of the embodiment of the device 8 for limiting axial displacement, the activation step of the device 8 for limiting axial displacement always operates itself out by simple displacement of the output shaft or the output shaft section from the or one of the insertion openings of the box towards the inside of the box to a predetermined position in which any axial displacement of the output shaft 5 or the output shaft section 5A or 5B inside the box 1 according to at least one direction opposite to the direction of insertion of the output shaft 5 or the output shaft section 5A or 5B into the box 1 is limited or prevented.

In the examples represented, the driving and driven members of the movement transmission 11 are prepositioned and mounted with a small amount of play inside the box and are configured to be recentered inside the box and carried by the output shaft or the output shaft sections in the inserted state of the output shaft or the output shaft sections in the box 1.

To conserve the sealing of the box, which generally contains a lubricant, each insertion opening 3 of the box 1 has, from the outside towards the inside of the box 1, at least a first cross-section 31 referred to as the outer cross-section and a second cross-section 32 referred to as the inner cross-section. Said first cross-section 31, of a greater dimension than the second cross-section 32, houses an annular sealing gasket 9 coaxial to said output shaft 5 or to the output shaft section 5A; 5B in the arranged state of said output shaft 5 or said output shaft section in said insertion opening 3 and the second cross-section 32 forms a bearing for the output shaft 5 or the output shaft section 5A; 5B by direct contact with said output shaft 5 or the output shaft section 5A; 5B in the arranged state of said output shaft 5 or said output shaft section 5A; 5B in said opening 3.

Figure 12C:
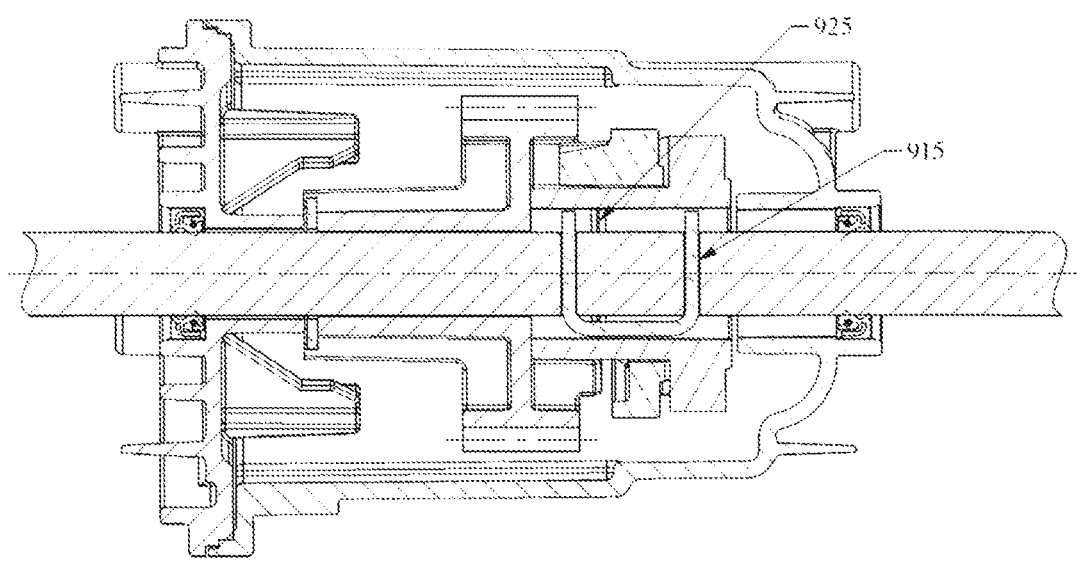
FIG. 12C represents a cross-section view of a transmission box according to the invention during the mounting of the output shaft made of a single piece on said box to pass from the inactive state to the active state of the device for limiting the axial displacement of the output shaft to be limited in displacement, the device being in the active state.

When the output shaft has an enlargement, as illustrated for example in FIGS. 12A to 13, the second inner cross-section 32 may have two opposing notches delimiting a passage for the enlargement of said output shaft.

The transmission box 1 also comprises, for driving in rotation the driving member 12 of the movement transmission 11, an electric motor 7 arranged outside of the transmission box 1 and carried by the transmission box 1. This electric motor 7 is equipped with a drive shaft 6 that can be positioned in engagement with the movement transmission 11 via an opening of the box represented in 4 in the figures.

Indeed, the motor 7 and the associated drive shaft 6 are arranged outside of the box and are carried by the box 1. The movement transmission 11 is connected to the drive shaft 6 via an opening 4 provided in the box 1 and through which the drive shaft 6 may be inserted into the box 1.

The motor 7 outside of the box therefore has a surface 14 referred to as the bearing surface that can be positioned bearing against the box 1 in the state of engagement of the drive shaft 6 with the movement transmission 11. In the examples represented, the electric motor 7 has the form of a cylinder and the drive shaft 6 protrudes from one of the circular end faces of the cylinder, at the level of the center of said end face.

The bearing surface 14 is formed by at least part of the surface of said end face surrounding said drive shaft 6.

The transmission box 1 also comprises a cover 15 that can be coupled to the box 1. This protection cover 15 of the electric motor 7 comes to cover the electric motor 7 in the coupled state of the cover 15 to the box 1.

This cover has here the form of a cylindrical or frusto-conical hollow open body at one end such that, via this open end, comes to cover the electric motor 7. This cover 15 therefore delimits an open cavity inside which the motor 7 is at least partially inserted. The opening of this cavity is closed by the box 1 in the coupled state of the cover 15 to the box 1. In this position, the motor is immobilized in rotation by cooperation of complementary forms of the cover and the motor and/or the motor and the box.

In at least some of the examples represented, the cover 15 is perforated and made from a dielectric material. The presence of perforations enables a ventilation of the electric motor 7 housed under the cover 15.

The transmission box 1 comprises an elastically deformable member 16 for holding the bearing surface 14 of the motor 7 in position bearing against the box 1. This elastically deformable member 16 is, in the coupled state of the cover 15 to the box 1, housed in the cover 15.

In the examples represented, the elastically deformable member 16 for holding the bearing surface 14 of the motor 7 in position bearing against the box 1 is here made in the form of a spiral coil spring arranged coaxial to the axis of rotation of the drive shaft 6. This spring is preferably a compression spring.

In the coupled state of the cover 15 to the box 1, the elastically deformable member 16 for holding the bearing surface 14 of the motor 7 in position bearing against the box 1 extends between the cover 15 and a surface of the motor 7 opposite to the bearing surface 14 of the motor 7 in bearing contact against the box 1.

In particular, the elastically deformable member 16 extends between the end face of the motor opposite to that from which the drive shaft 6 protrudes and the closed end face of the cylinder or the constitutive truncated cone of the cover 15, this elastically deformable member 16 being arranged inside the cavity provided by the cover 15. Thus, in the coupled state of the cover 15 to the box 1, the elastically deformable member 16 comes to bear on the bottom of the cover 15 and presses the electric motor 7 onto the box 1.

One notes that in the examples represented, the drive shaft 6 and the output shaft 5 extend substantially parallel to each other, i.e., more or less 10° close.

The cover 15 may be coupled to the box 1 by different types of connections. Thus, in the example represented in FIG. 7, the cover 15 is, in the coupled state to the box 1, fastened to the box 1 by a click-fastening connection. The click-fastening connection between the cover 15 and the box 1 comprises elastically deformable elements 17 carried by the cover 15, retaining elements 18 carried by the box 1. The elastically deformable elements 17 carried by the cover 15 are configured to, when the cover 15 is being coupled to the box 1, by bearing contact with the retaining elements 18, move away from the box 1 to cross over the retaining elements 18 before moving closer towards the box 1, these elastically deformable elements being held in a position bearing against the retaining elements 18 by the elastically deformable member 16 for holding the bearing surface 14 of the motor 7 in position bearing against the box 1.

In particular, at least one of the elastically deformable elements 17 has the form of a loop inside which a retaining element 18 that is in the form of a notch or lug is configured to be at least partially inserted. Thus, once engaged, under the effect of the elastically deformable member 16, the loop comes to bear against said notch.

To further improve the assembly, the cover comprises a guiding element, i.e., here a longitudinal groove inside which a complementary guiding element such as a longitudinal rib of the box 1 is capable of being inserted when coupling the cover to the box 1. These guiding elements form, in the assembled state one with each other, a slide.

As a variant, the cover 15 may, in the coupled state to the box 1, be fastened to the box 1 by a bayonet type of mount. In this case, the box 1 may be equipped with a notch into which a pin of the cover 15 can be inserted when coupling the cover 15 to the box 1.

Thanks to the design of the transmission box 1, as described above, both the motor and the output shaft may be mounted on the box 1 in the closed state of the box 1. This results in an overall simplicity.

The invention claimed is:

1. A transmission box comprising:
    at least two box portions assembled together in the closed state of the box,
    at least one opening for the access to the inside of the box and
    an output shaft that can be inserted into the box through at least the one of the openings referred to as the insertion opening of the box, and configured to, in the inserted state in said box and closed state of box, extend at least partially out of the box, this output shaft being made of a single piece or at least two shaft sections,
    the box further comprising, for the output shaft or at least one of the output shaft sections, at least one device for limiting the axial displacement of the output shaft or the output shaft section according to at least one direction opposite to the direction of insertion of the output shaft or the output shaft section into said box in the inserted state of the output shaft or the output shaft section in the box and in the closed state of the box,
    wherein this device for limiting axial displacement able to be activated to pass from an inactive state to an active state in which any axial displacement of the output shaft or the output shaft section inside the box according to at least one direction opposite to the direction of insertion of the output shaft or the output shaft section into the box is limited or prevented is a device that can be activated in the closed state of the box,
    wherein the device for limiting the axial displacement of the output shaft or the output shaft section according to at least one direction opposite to the direction of insertion of the output shaft or the output shaft section into said box comprises at least a first part carried by the output shaft or said output shaft section to be limited in axial displacement and a second part housed inside the box,
    wherein at least the second part of the device for limiting the axial displacement of the output shaft or the output shaft section according to at least one direction opposite to the direction of insertion of the output shaft or the output shaft section into said box, which is an elastically deformable part, has the form of a self-locking axle lock washer provided with elastically deformable inner radial tabs, in that the first part of the device for limiting the axial displacement of the output shaft or the output shaft section at least according to one direction opposite to the direction of insertion of the output shaft or the output shaft section into said box is formed by a segment portion of the output shaft or the output shaft section and in that, in the activated state of the device for limiting axial displacement, the tabs of the lock washer extend around the segment portion of the output shaft or the output shaft section forming the first part of the device for limiting axial displacement and occupy, in relation to said segment portion of the output shaft or of the output shaft section, an angular clamping position in which any displacement of the output shaft or the output shaft section at least according to one direction opposite to the direction of insertion of the output shaft or the output shaft section into said box is limited or prevented by buttressing of said tabs on the segment portion of the output shaft or the output shaft section, and
    in that this device for limiting axial displacement is configured to, in the closed state of the box, pass from an inactive state to an active state, depending on the position occupied by the output shaft or said output shaft section in said box, by the simple displacement of the output shaft or the output shaft section from the or one of the insertion openings of the box towards the inside of the box to a predetermined position.

2. The transmission box according to claim 1, wherein at least the or one of the insertion openings of the box has from the outside towards the inside of the box at least a first cross-section referred to as the outer cross-section and a second cross-section referred to as the inner cross-section, in that said first cross-section, of a greater dimension than the second cross-section, houses an annular sealing gasket coaxial to said output shaft or to the output shaft section in the arranged state of said output shaft or said output shaft section in said insertion opening and in that the second cross-section forms a bearing for the output shaft or the output shaft section by direct contact with said output shaft or the output shaft section in the arranged state of said output shaft or said output shaft section in said opening.

3. The transmission box according to claim 1, wherein the box comprises, on the inside, at least one abutment of end of stroke against which the output shaft or the output shaft section to be limited in axial displacement is capable to bear in the activated state of the device for limiting axial displacement, so that any displacement of the output shaft or the output shaft section into the box in the direction of an insertion of the output shaft or the output shaft section into the box is prevented beyond said abutment of end of stroke.

4. The transmission box according to claim 1, wherein the device for limiting the axial displacement of the output shaft or the output shaft section according to at least one direction opposite to the direction of insertion of the output shaft or said output shaft section into said box is, in the activated state, entirely housed inside the box.

5. The transmission box according to claim 1, wherein at least one of the first or second parts of the device for limiting the axial displacement of the output shaft or the output shaft section according to at least one direction opposite to the direction of insertion of the output shaft or the output shaft section into said box is a part at least partially elastically deformable and in that said part is at least partially elastically deformable depending on the position occupied by the output shaft or said output shaft section in said box to allow, by elastic deformation of said part under the effect of the displacement of the output shaft or the output shaft section from the or one of the insertion openings of the box towards the inside of the box to the predetermined position the passing of the device for limiting axial displacement from the inactive state to the active state.

6. The transmission box according to claim 1, wherein the box houses a movement transmission comprising at least one rotary driving member and at least one driven member configured to be traversed by the output shaft, the or each driven member to which the rotational displacement of the driving member is capable of being transmitted being rotationally secured to the output shaft or the output shaft section that carries it.

7. The transmission box according to claim 6, wherein the second part of the device for limiting the axial displacement of the output shaft or the output shaft section according to at least one direction opposite to the direction of insertion of the output shaft or the output shaft section into said box is carried by the or one of the driven members or arranged between one of the driven members and the driving member.

8. The transmission box according to claim 6, wherein said transmission box comprises an electric motor arranged outside of the box and carried by the box, this electric motor being equipped with a drive shaft that can be positioned in engagement with the movement transmission via one of the openings provided in the box, this electric motor having a surface referred to as the bearing surface that can be positioned bearing against the box in the engaged state of the drive shaft with the movement transmission, this motor being protectable by a cover that can be coupled to the box, and the transmission box comprising an elastically deformable member for holding the bearing surface of the motor in position bearing against the box, this elastically deformable member being, in the coupled state of the cover with the box, housed in the cover.

9. A self-propelled machine, such as a lawnmower, comprising:
a transmission box according to claim 1.

10. A method for mounting the transmission box of claim 1,
where said at least two box portions can be assembled together to pass the box from an open state to the closed state,
wherein the method comprises:
after closing of the box and partial insertion of the output shaft or an output shaft section into the or one of the insertion openings of the box, a step of activation of the device for limiting axial displacement to pass the device from an inactive state to an active state in which any axial displacement of the output shaft or the output shaft section inside the box according to at least one direction opposite to the direction of insertion of the output shaft or the output shaft section into the box is limited or prevented, this activation step operating itself by simple displacement of the output shaft or the output shaft section from the or one of the insertion openings of the box towards the inside of the box to a predetermined position in which any axial displacement of the output shaft or the output shaft section inside the box according to at least one direction opposite to the direction of insertion of the output shaft or the output shaft section into the box is limited or prevented.

\* \* \* \* \*